United States Patent [19]
Kojima

[11] Patent Number: 4,901,166
[45] Date of Patent: Feb. 13, 1990

[54] TRACKING CONTROL FOR VTR EDITING EMPLOYING PREVIOUSLY RECORDED TRACKING INFORMATION

[75] Inventor: Toshiaki Kojima, Kanagawa, Japan

[73] Assignee: Sony Corporation, Tokyo, Japan

[21] Appl. No.: 24,712

[22] Filed: Mar. 11, 1987

[30] Foreign Application Priority Data

Mar. 20, 1986 [JP] Japan .................................. 51-064563

[51] Int. Cl.⁴ .............................................. G11B 27/02
[52] U.S. Cl. .................................... 360/14.1; 358/311; 360/77.13
[58] Field of Search .............................. 360/14.1–14.3, 360/77.12, 77.13; 358/311

[56] References Cited

U.S. PATENT DOCUMENTS

| | | | |
|---|---|---|---|
| 4,428,001 | 1/1984 | Yamamura et al. | 360/14.1 X |
| 4,463,391 | 7/1984 | Takano et al. | 360/14.2 |
| 4,532,502 | 7/1985 | Menzes et al. | 360/14.1 X |
| 4,689,706 | 8/1987 | O'Gwynn | 360/14.1 X |

FOREIGN PATENT DOCUMENTS

| | | |
|---|---|---|
| 0103463 | 3/1984 | European Pat. Off. . |
| 0114508 | 8/1984 | European Pat. Off. . |
| 54-48510 | 4/1979 | Japan .................................. 360/77.12 |
| 59-198556 | 10/1984 | Japan .................................. 360/77.13 |

*Primary Examiner*—Aristotelis M. Psitos
*Attorney, Agent, or Firm*—Lewis H. Eslinger; Jay H. Maioli

[57] ABSTRACT

A method and apparatus for editing video information from one or more video tapes onto a master tape, in which different video tape recorders can be used to produce the master tape, involves the storage of tracking information that was used in recording a segment at a position immediately preceding the desired editing point on the master tape, and also stores tracking information that was used in recording another segment at a position on the master tape some time prior to the segment next preceding the edit point. A difference value between the two stored tracking information signals is detected and compared with a predetermined value, and the comparison result is used to select one of the two stored tracking information signals to control the tracking during recording at the desired editing point, so that small head position detector errors will not accumulate over a number of edit points on the master tape.

8 Claims, 5 Drawing Sheets

TRACKING CONTROL FOR VTR EDITING EMPLOYING PREVIOUSLY RECORDED TRACKING INFORMATION

BACKGROUND OF THE INVENTION

1. Field of the Invention

This invention relates generally to a video tape recorder and, more particularly, to tracking control during an editing operation that can involve utilizing at least two such video tape recorders.

2. Description of the Prior Art

Editing recorded information typically involves the arrangement of one or more portions that have been previously recorded onto a single composite record medium, which is the so-called master tape. A master tape can be produced using a single source tape or a number of source tapes and such editing operations are referred to as assembly editing, in which the signal segment that is to be reproduced from one tape and subsequently recorded on the master tape is typically referred to as a cut. Thus, using assembly editing techniques, a number of cuts can be recorded sequentially on the so-called master tape. Therefore, assuming video information is involved, at least one video tape playback apparatus and at least one video tape recording apparatus are required to perform the assembly editing technique described above and, typically, these units are the well-known video tape recorders. Although video tape recorders are produced to high manufacturing standards, there are some measurable differences, which fall within the manufacturing tolerances, among all of the video tape recorders that are produced. For example, the phase of a video signal recorded by the rotary recording head will almost always be found to be slightly different than the phase of a control signal (CTL) that is recorded by a fixed control head. This phase difference is referred to hereinafter as CTL phase information. Another example of manufacturing discrepancies that may occur among video tape recorders is that the location of the head on the head mounting element, typically known as a dynamic tracking device (DT), can vary by a measurable amount even though the head locations are within manufacturing tolerances. Hereinafter, such differences in head mounting location that occur during manufacturing are referred to as head position information. Therefore, if assembly editing is achieved by moving the master tape from one video tape recorder to another video tape recorder, the differences of the CTL phase information or the head position information will cause an abrupt change in pitch between the last track of a cut and the first track of the next cut on the master tape, which will then adversely affect the tracking servo of a video tape recorder in the playback mode. The tracks in each individual cut will, of course, all have the same pitch and the tracking servo of the video tape recorder can provide correct tracking for each such cut.

In order to resolve the above-described problem it has been proposed to control the tracking by changing either the CTL phase or the head position, in accordance with tracking information obtained by reproducing a cut located prior to the desired editing point. This operation is aptly termed tracking adjustment, and it is generally possible to provide a smooth editing-in of the cut at the desired position. Nevertheless, disadvantages still remain in this proposed approach. More particularly, although an abrupt change of the head tracking can be prevented between the end of one cut and the beginning of the next cut at the editing point using the above-described tracking adjustment, there nevertheless is detected a small appreciable tracking discrepancy at the editing point between the last track and first track of successive cuts. This tracking discrepancy has been found to occur whether or not tracking adjustments are made using CTL phase information or dynamic tracking head information and is thought to be due to inherent errors in the head position detector used in tracking control and to the fact that there are no control signal pulses on the tape at the location at which the next cut is to be recorded. Although this tracking discrepancy initially appears to be a minor problem and, by itself, is not a serious problem, in an assembly editing operation a large number of cuts will typically be recorded on the master tape by the same video tape recorder, maybe up to two hundred cuts. Even using the same tape recorder a tracking adjustment as described above will be necessary and since the same video tape recorder is used the head position detector error at each editing point, for example, can be considered to be substantially the same. Therefore, the tracking discrepancy that occurs at each editing operation will accumulate, and the accumulated tracking discrepancy will become appreciable so as to be readily noticeable and objectionable. Not only will such accumulated discrepancies become noticeable but in the case of a video tape recorder with the head mounted on a dynamic tracking element, the result will be that the dynamic tracking element will be driven to the limit of its deflection, with no travel remaining to accommodate additional tracking discrepancies.

OBJECTIONS AND SUMMARY OF THE INVENTION

It is an object of the present invention to provide a method and apparatus for use in assembly editing using video tape recorders that can eliminate the above-noted defects inherent in the prior cut.

Another object of this invention is to provide a video tape recorder that can prevent an accumulation of tracking discrepancy errors, even if the assembly editing process is performed repeatedly using the same video tape recorder.

In accordance with an aspect of the present invention, to solve this problem in the case of editing a new cut a video tape recorder is controlled using tracking information detected by a tracking information detecting system from a cut that was made prior to the desired editing point. Such tracking information detection circuitry includes a first memory area to store the tracking information of the next preceding the edit point and a second memory area to store tracking information from some other cut that was made prior to that next preceding cut to be used as reference tracking information. One or the another of these two tracking information portions is selected to control the tracking, and thus the pitch between the last and first tracks of adjacent cuts, is based upon comparison of the difference therebetween with a preselected reference value. In this way, because the tracking information that is used has not been derived anew for every cut, inherent errors in the head position detector, for example, will not be present for every new cut and, thus, will not accumulate.

The above and other objects, features, and advantages of the present invention will become apparent from the following detailed description of illustrative embodiments thereof to read in conjunction with the accompanying drawings, in which like references numerals represent the same or similar elements.

DETAILED DESCRIPTION OF PREFERRED EMBODIMENTS

Figure 1:
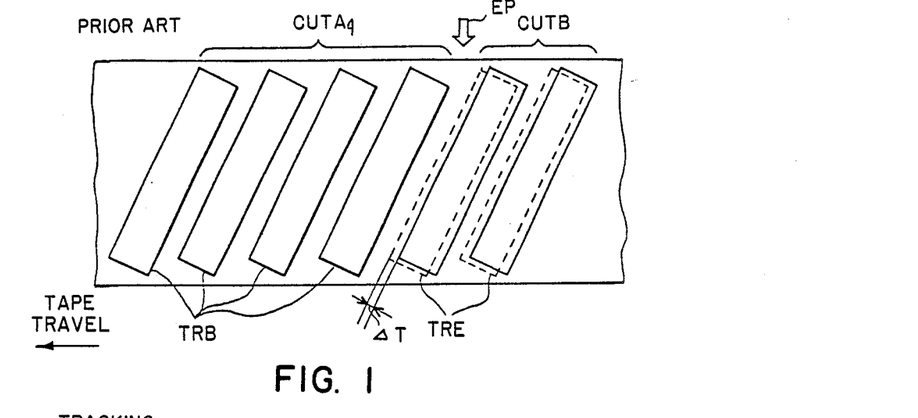
FIG. 1 is a diagrammatic representation of transverse tracks formed on a magnetic tape using known apparatus.

FIG. 1 represents a master tape that has been assembly edited following the previously proposed technique by changing the control phase or the head position in accordance with the stored tracking information, which changes have been referred to as the CTL phase information or head position information, respectively. In FIG. 1, the information that has already been edited-in is arranged in tracks TRB and is denoted as CUT A, which is located ahead of or prior to the editing point EP in relation to the direction of tape travel. The object is then to adjust the location of the beginning tracks TRE of CUT B relative to the location of the last tracks TRB of CUT A, which have already been recorded, so that there is no discernible change in track pitch between cuts when the master tape is played back. FIG. 1 shows this operation having been successfully accomplished to permit acceptable playback. Even so, there is a finite, detected tracking discrepancy between the end of CUT A and the beginning of CUT B at the editing point EP is denoted as $\Delta T$. This tracking discrepancy can be due to detector error or the like, as described above.

Figure 2:
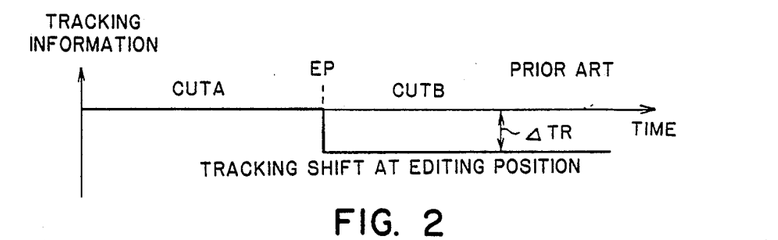
FIG. 2 is a graph showing a tracking discrepancy at an editing point in FIG. 1.

FIG. 2 represents this tracking shift between the end of CUT A and the beginning of CUT B at the editing point EP as a difference $\Delta TR$, which is derived either from the CTL phase information or the DT head position information.

Figure 3:
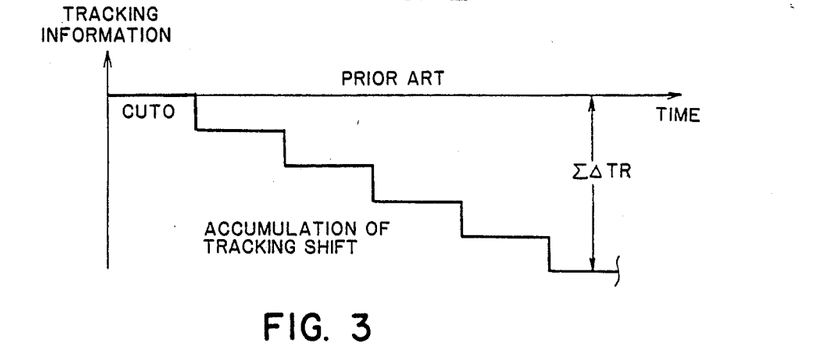
FIG. 3 is a graph representing an accumulation of tracking discrepancies, such as in FIG. 2, that occur in the known apparatus.

Now, the problem discussed above is seen more clearly in that these tracking discrepancies and the head shifts necessary to correct them will occur at successive edit points EP and will tend to accumulate, and the sum will become very large. A summation of successive $\Delta TR$ tracking shifts starting with the tracking information of a first cut, referred to as the base track CUT 0, is shown in FIG. 3. Thus, it is seen that with successive editing operations the accumulation of these tracking shifts becomes quite large and objectionable, when using the previously proposed system.

Figure 4:
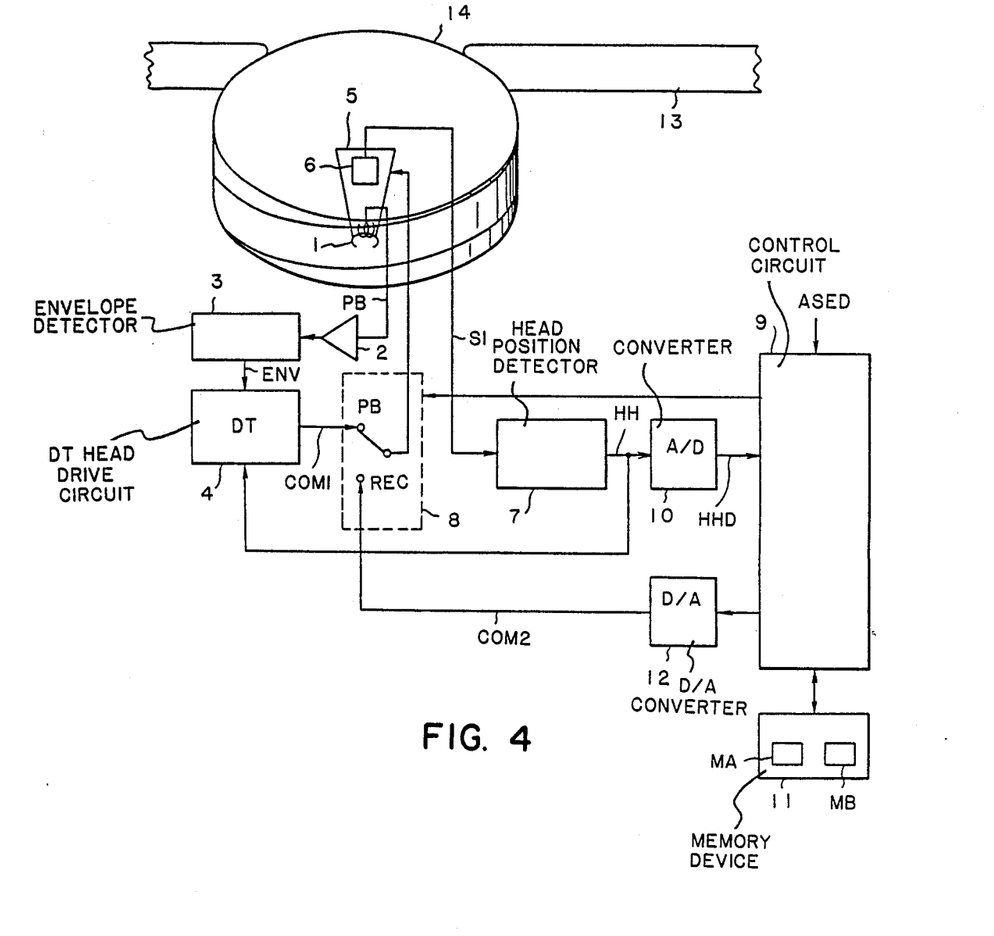
FIG. 4 is a schematic representation in block diagram form of a video tape recorder having a tracking control system according to the present invention.

The embodiment of the present invention of FIG. 4 provides tracking control in an assembly editing operation by controlling the dynamic tracking (DT) of the head position, yet which avoids inherent detector error by using, if possible tracking information that was used before instead of deriving new information each time. A system to obtain head position information for use as tracking information by reproducing a cut that is recorded ahead of the editing point is described in detail. A video signal PB is produced by a dynamic tracking head 1 from a magnetic tape 13 that has been wrapped in a helical fashion about guide drum 14. This reproduced video signal PB is fed through a playback amplifier 2 to an envelope detector 3. Envelope detectors are well-known in this technology, and the envelope signal ENV detected by envelope detector 3 is then fed to a dynamic tracking (DT) head drive circuit 4. Magnetic head 1 is mounted on a deflectable head mounting element 5, which conventionally comprises a bimorph leaf, and in order to determine the extent of deflection of such bimorph leaf, a deflection detecting device 6 is provided. Deflection detecting device 6 typically comprises a strain gauge and provides a detection signal Sl fed to a head position detector 7. Head position detector 7 generates a head position signal HH that indicates a position (head height) of the dynamic tracking head 1 and which is fed back to the head dive circuit 4. Head drive circuit 4 generates a head position correction command signal COM 1 that drives bimorph leaf 5 so that the output ENV of envelope detector 3 is maximized, as determined by head drive circuit 4. More specifically, the head position correction command signal COM 1 is fed to playback contact PB of switch 8 for connection directly to bimorph leaf 5. Operation of switch 8 is under the control of the control circuit 9 and during playback the head position correction command signal COM 1 controls the position of bimorph leaf 5 and dynamic tracking head 1 to be in the optimum tracking position. These detectors and drive circuit can all be a source of error contributing to the discrepancy described above.

Control circuit 9 receives the head position signal HH from head position detector 7 after it has been converted to digital form (HHD) by an analog-to-digital converter 10. Then, digital head position signal HHD is fed to control circuit 9, which typically comprises a microprocessor and the relevant operation thereof will be explained in detail hereinbelow. Connected to control circuit 9 is a memory device 11 that aids in generating a tracking information signal used to control the head position in the assembly editing mode. The generated control digital signal is converted to an analog control signal COM 2 by passing it through a digital-to-analog converter 12 and then applying it through the record terminal (REC) of switch 8 to bimorph leaf 5. Memory unit 11, which is connected to control circuit 9, has two separate memory areas, MA and MB. Control circuit 9 operates to control the tracking operation in the assembly edit mode in accordance with the procedure that is shown in FIG. 5.

Figure 5:
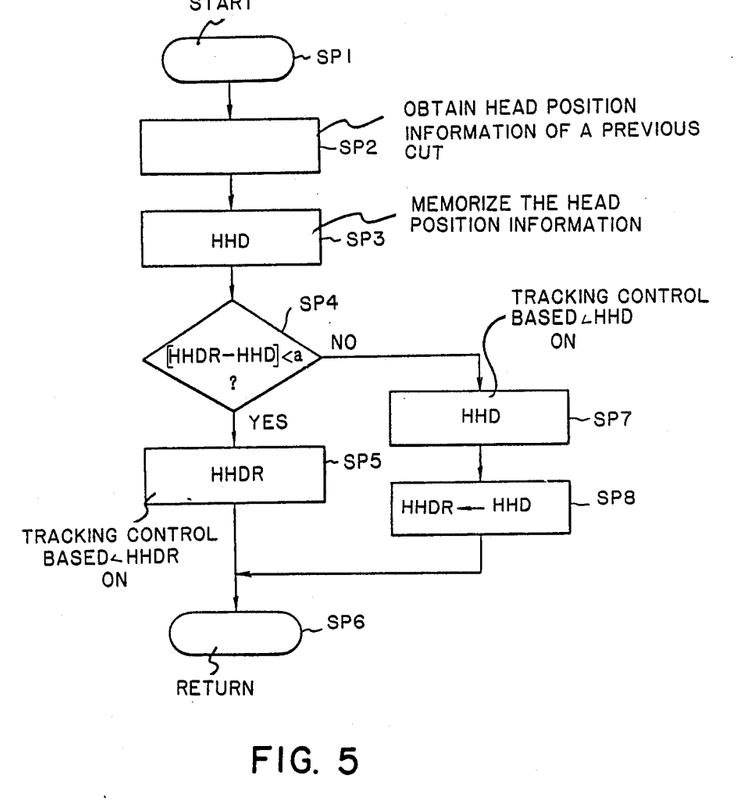
FIG. 5 is a flow chart of a processing procedure carried out by control apparatus 9 of the system of FIG. 4.

Referring now to FIG. 5, Start step SP1 commences after an assembly edit command signal ASED has been provided to the control circuit 9 from a manual keyboard (not shown) or the like. In the next operation SP2, tape 13 is rewound by a tape drive mechanism (not shown) in order to reproduce the cut (CUT A) that was recorded just prior to the desired editing point EP. To accomplish this, switch 8 is operated to select the reproducing mode terminal (PB), and the digital data HHD is applied to control circuit 9. In step SP3 the digital data corresponding to that head position is stored in tracking storage area MA of memory device 11. Once such storage has occurred, a decision is made in control circuit 9 corresponding to the decision at step SP4 in FIG. 5, more particularly, the absolute value of the difference ER between a reference head height digital data HHDR stored in a reference tracking storage area MB of memory device 11, which was used as a reference head position information for tracking control at some previous edit point before the cut next preceding the edit point, and the head height digital data HHD that was just obtained and stored in storage area MA is determined. The detected difference value ( HHDR−HHD ) is compared with a predetermined value a. The predetermined value a is selected to be a value sufficient to determine whether the difference data ER depends on a detector error of the head position signal HH or on a compatibility problem between video tape recorders, for example, where the previous cut on the master tape had been recorded by a different video tape recorder. Although the value of a can be selected to be any desired value sufficient to distinguish between these two situations, a value that has been found to be advantageous for use corresponds to 3–4% of the track width. If, as a result of the comparison represented in step SP4, the decision is made that the difference ER is smaller than the predetermined value a, the operation of control circuit 9 proceeds to step SP5 and switch 8 is changed to the recording mode terminal REC after head 1 comes up to the editing point. There, the head position digital data HHDR from an earlier cut that had been stored in storage area MB of memory 11 is applied to bimorph leaf 5 through a digital-to-analog converter 12. Then at step SP6, the control of the microprocessor returns to the main routine, which forms no part of the present invention. As described hereinabove, dynamic tracking head 1 performs editing using tracking information (COM 2) that is not based upon the head position information obtained from the cut next preceding the editing point EP but, rather, is based on head position information of a cut that was recorded at least twice removed from the editing point.

On the other hand, if at step SP4 the result of the comparison is NO, that is, the absolute value of the difference data ER is larger than the reference value a, control circuit 9 operates to perform an operation shown as step SP7. At step SP7, switch 8 is changed to the recording mode (REC) after the dynamic tracking head 1 comes up to editing point EP and then head position digital data HHD that was stored in memory storage area MA of memory 11 is fed to bimorph leaf 5 through digital-to-analog converter 12 and switch 8. Thus, the head position of dynamic tracking head 1 used to record CUT B is based solely on the head position information that was obtained from the cut immediately preceding the editing point EP. In other words, no change. After such head shift operation then, control circuit 9 performs step SP8 at which the head position digital data HHD that had been stored in the storage area MA is transferred to storage area MB in memory 11 and now becomes the new reference data (HHDR). After such transfer, the program then returns to the main routine by way of step SP6.

Accordingly, as described hereinabove, the process of step SP5 is selected when the absolute value of the difference between the so-called reference head height value (HHDR) of a previous cut and the head height value (HHD) of the last cut recorded before the current edit point is smaller than the predetermined value a. This results in the editing in of a new cut at edit point EP by using the same head position information that had been used to record a previous cut sometime before the cut immediately preceding the edit point. Thus, the head shift value will be zero. In other words, by examining the head shift information of two cuts that both precede the edit point it is possible to determine if the same VTR made those cuts and, if so, then the head need not be shifted to record the current cut at edit point EP. On the other hand, when the absolute value of difference ER is larger than the predetermined value a, the procedures of steps SP7 and SP8 are followed, thereby to edit a new cut at edit point EP by using the head position information (HHD) that corresponds to the cut immediately preceding the edit point. Then, this preceding cut head position information becomes the reference head height data (HHDR) and is shifted into storage area MB of memory 11. An initial value can be set into storage area MB when the program is first in an initialization mode, not shown in FIG. 5.

Figure 6:
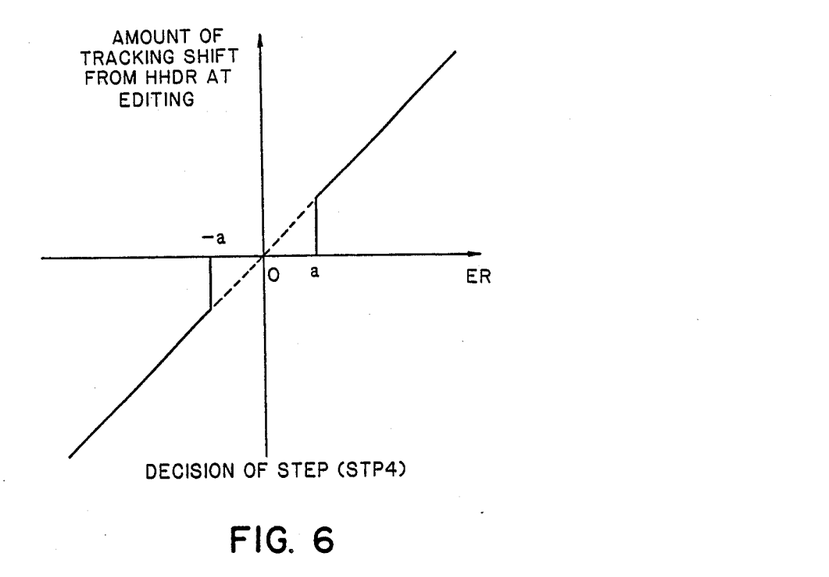
FIG. 6 is a graph representing a tracking discrepancy at an editing point using the apparatus of FIG. 4.

The decisional step SP4 of FIG. 5 is represented graphically in FIG. 6, in which it is seen that the amount of tracking shift is linearly related to the difference signal ER, provided the absolute value of such difference exceeds predetermined value a.

Figure 7:
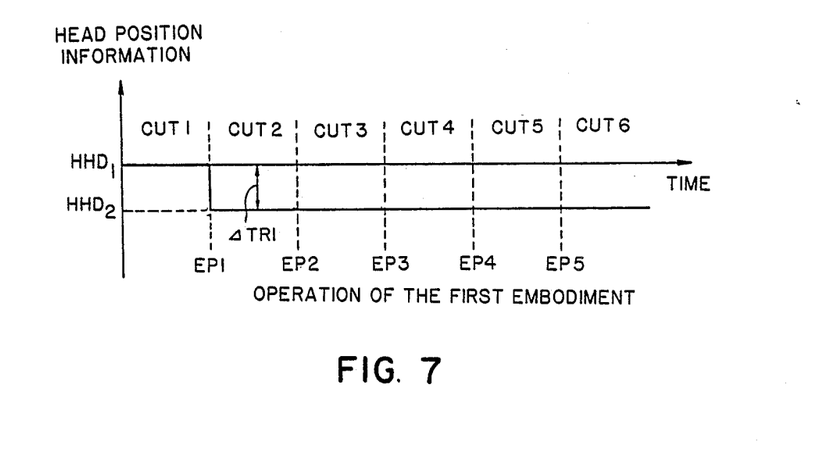
FIG. 7 is a graph representing the tracking discrepancies provided by the apparatus of FIG. 4 in which there is no accumulation.

The operation of the apparatus of FIG. 4 in accordance with the process shown in FIG. 5 is further explained using FIG. 7, in which it is seen that when CUT 2 is edited at a first editing position EP1 that occurs at the end of CUT 1, assuming that the decision result at step SP4 in the operating procedure of FIG. 5 is NO, because an initialize value has been stored in the reference tracking data storage area MB that results in the difference value ER being larger than the predetermined value a, CUT 2 is edited based on a head position information HHD1 of CUT 1 located just prior to editing point EP1, according to step SP7.

In this assembly editing operation, the head will be shifted only by an amount $\Delta TR1$ relative to the head position before the editing point EP1, however, this tracking shift $\Delta TR1$ is based upon the actual detector error and, thus, the amount of the tracking shift is small. Continuing this example, the initialized value stored in the reference tracking storage area MB of memory 11 that was assumed to be the head position information $HHD_1$ of CUT 1 is retained in storage area MB as the reference head position information (HHDR). Then, in the editing operation of a further CUT 3 at an editing point EP2, the head position information HHD1 of the initial CUT 1 will be compared with the head position information $HHD_2$ of CUT 2 that is stored in storage area MA. Thus, the error value ER will be the difference between the detected head position information $HHD_2$ and the head position information $HHD_1$ and will be equal to the detector error $\Delta TR1$. In this situation, because the preselected value a will be larger than the detector error $\Delta TR1$, the decisional result of step SP4 will be YES, and the new CUT 3 is edited based on the head position information $HHD_1$ that used in earlier CUT 1, which is now the so-called reference head position information (HHDR). Thus, because CUT 3 is edited using the head shift corresponding to the detector error $\Delta TR1$ derived from CUT 1, no new detector error is introduced and there should be little or no tracking shift relative to CUT 2. When this editing of CUT 3 has been completed, the head position information of initial CUT 1 will still be stored in the reference tracking data storage area MB of memory 11. Then, as with the above-described operation, editing of a subsequent CUT 4 at editing point EP3 will be based again on the head position information $HHD_1$ of initial CUT 1, because that information $HHD_1$ has been stored in storage area MB and the decisional result of step SP4 will again be YES. Then, when CUT 4 is edited, it will have the detected error $\Delta TR1$ that had been provided relative to CUT 1 already included, and there will be little or no tracking shift relative to CUT 3.

Therefore, it is seen the editing of a new cut is accomplished using information based upon the head position information $HHD_1$ of a first CUT 1, when the new cut is to be edited into the same master tape using the same video tape recorder. In this fashion, it is possible to assembly edit new cuts having relatively little or no tracking shift at the subsequent respective editing points, for example, at edit points EP2, EP3, EP5 . . . .

There are, of course, various approaches to performing editing operations and an example of another such editing operation is where the master tape is first produced using a first video tape recorder and then the editing process onto that master tape is continued utilizing another video tape recorder. In that case, because a video tape recorder cannot distinguish whether a master tape placed therein has been changed to another master tape, the difference value (ER) compared with the predetermined value a at step SP4 of FIG. 4 is the difference between head position information HHDR obtained from the first master tape before it was changed, and which was stored in reference tracking storage area MB, and head position information HHD that is detected from the second master tape after it has been placed in the video tape recorder and played back up to a position just prior to the edit point. In such situation, it has been found that even though the relevant characteristics of each of the two video tape recorders are within the specified tolerances, in most cases the difference value ER ($|HHDR-HHD|$) will be larger than the predetermined value a. As a result of this, the decisional result in step SP4 will be NO, so that the editing of a new cut is recorded using new head position information based upon head position information obtained from the cut immediately preceding the edit point on the new or second master tape. In this way the tracking is adjusted exactly, although there may exist a small tracking error at the editing position between the two cuts due to recorder tolerances. Nevertheless, this tracking error will be negligible when compared to the tracking error that would be present if the editing used the tracking information from the first master tape.

Therefore, in this embodiment the dynamic head tracking can be adjusted exactly and upon repeated assembly editing operations the detected error will not be accumulated, and it is possible to avoid the situation in which accumulated detected tracking errors will exceed the bending limits of the bimorph leaf upon which the head is mounted.

Figure 8:
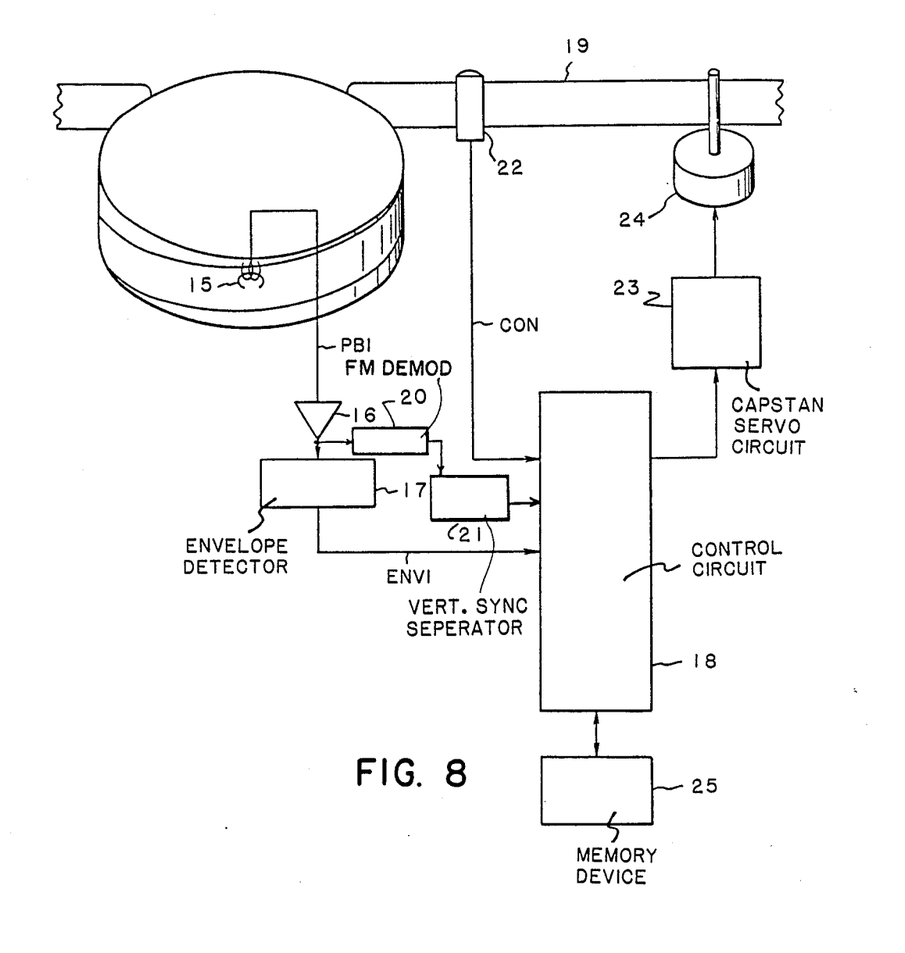
FIG. 8 is a schematic representation in block diagram form of another embodiment of a tracking control system according to the present invention.

As described above, the present invention solves the problem in which a change in pitch between the last track of one cut and the first track of a subsequent cut is corrected with tracking information that includes detector error, such that new tracking information is not derived for each new cut, thereby presenting the accumulation of these detector errors. There are, of course, two approaches to controlling track pitch, either shift the head or alter the relative tape-head speed. A further embodiment of the present invention is shown in FIG. 8, in which the pitch of the tracks in an assembly editing mode is altered by controlling the speed of the tape, for example, by controlling the capstan drive speed. In the embodiment of FIG. 8, the video signal PB1 reproduced from magnetic tape 19 using a recording and reproducing head 15, which need not be mounted on a bimorph leaf, is applied through a playback amplifier 16 to an envelope detector 17 and the resultant level signal ENV1 is fed to a control circuit 18, which is essentially the same as control circuit 9 of the embodiment shown in FIG. 4. This amplified video signal output from video amplifier 16 is also fed to an FM demodulator 20 and then to a vertical sync separator circuit 21, which separates the vertical sync signal from the demodulated video signal. The separated vertical sync pulses are then fed to control circuit 18. A control signal CON that was recorded on the tape 19 is picked up by a stationary control head 22 and also fed to control circuit 18. The control circuit 18 control operates in part to the drive of tape 19 by use of a capstan servo circuit 23 that provides the control signal for the capstan motor 24, which cooperates with a pinch roller (not shown) to drive tape 19. More particularly, capstan servo circuit 23 drives tape 19 in order to maximize the level of the detected envelope signal ENV1, as determined by control circuit 18. In performing the maximizing function, the control circuit 18 detects a phase difference (CTL phase information) between the phase of the control signal CON and the phase of the vertical sync pulses separated from the reproduced video signal PB1. Control circuit 18 then controls the capstan servo circuit 23 in accordance with that phase difference information (CTL phase information).

Therefore, in this embodiment, the tracking information is based on the CTL phase information and control circuit 18 can control the tracking adjustment at each assembly editing point by utilizing substantially the same procedure as discussed above relative to FIG. 5 and utilizing a memory device 23, which is connected to control circuit 18. More particularly, in the operation of this embodiment it is seen that the CTL phase information is detected by reproducing the cut just prior to the editing point, detecting a difference between that detected CTL phase information and another CTL phase information, which was used as a reference at a previous editing point, and then comparing the calculated difference with a predetermined value that is capable of distinguishing whether such difference depends on a detector error ($\Delta TR$) or on a different characteristic between two video tape recorders. Then, in the situation where the calculated difference is smaller than the predetermined value the cut is edited using the CTL phase information that was used at the previous editing point so that no new detector error need be accommodated and, where the calculated difference is larger than the predetermined value, tracking control is based on the newly detected CTL phase information.

Therefore, the second embodiment can also avoid accumulation of tracking shifts even if the assembly editing is repeatedly recorded on the same master tape using the same video tape recorder, and it can correct for tracking errors when the master tape is used in a different video tape recorder.

The above description is given on a single preferred embodiment of the invention, but it will be apparent that many modifications and variations could be effected by one skilled in the art without departing from the spirit or scope of the novel concepts of the invention, which should be determined by the appended claims.

What is claimed is:

1. Editing apparatus for recording an information signal in transverse tracks at respective editing points on a record medium, comprising:
   a transducing device;
   means for generating tracking information signals from previously recorded signals on the record medium indicative of respective relative positions between at least first and second groups of tracks at respective locations on said record medium and said transducing device;
   means for generating a difference signal between generated first and second tracking information signals obtained from a first location prior to an editing point on said record medium and a second location prior to the first location, respectively; and
   position controlling means for selecting one of said first and second tracking information signals based upon the generated difference signal and for controlling a relative position between the record medium and the transducing device in response thereto, said position controlling means including means for comparing the difference signal with a predetermined value contained within said means for comparing that represents a percentage of a track width, so that one of the first and second tracking information signals is selected in response to a result of the comparison.

2. The apparatus according to claim 1, in which said transducing device includes a bimorph leaf and a head attached thereon so that said position controlling means controls the bimorph leaf.

3. The apparatus according to claim 1, in which the first tracking information is selected when a value of the difference signal is larger than the predetermined value.

4. The apparatus according to claim 1, in which the second tracking information is selected when a value of the difference signal is smaller than the predetermined value.

5. The apparatus according to claim 1, in which said difference signal includes a first and second memory for storing the first and second tracking information signals, respectively.

6. The apparatus according to claim 5, in which said record medium is a longitudinal magnetic tape and said position controlling means includes a capstan servo apparatus so that said magnetic tape is driven thereby.

7. The apparatus according to claim 6, in which said first and second tracking information signals both represent phase information of CTL pulses recorded at predetermined distances on said longitudinal magnetic tape.

8. A method for assembly editing a video signal in groups of successive tracks on a longitudinal magnetic tape by using a rotary recording and reproducing head, comprising the steps of:
   detecting at least one tracking information signal representing a relative position between said recording and reproducing head and a respective group of successive tracks when an envelope level of a reproduced video signal is substantially at a maximum, storing the tracking information signal in a first memory, comparing the stored tracking information signal with another tracking information signal detected from another group of successive tracks at a previous editing point that is stored in a second memory, generating a difference signal between the above two tracking information signals, and comparing the difference signal with a predetermined value sufficient to distinguish between the two signals and representing tracking error as a percentage of a track width;
   controlling the relative position between the recording and reproducing head and the successive tracks in response to one of said two tracking information signals selected with respect to a result of said comparison of the difference signal with said predetermined value representing tracking error as a percentage of track width, so that one of the first and second tracking information signal is selected in response to a result of the comparison, and
   recording a video signal on said longitudinal magnetic tape at an edit point using said recording and reproducing head.

* * * * *

UNITED STATES PATENT AND TRADEMARK OFFICE
CERTIFICATE OF CORRECTION

PATENT NO. : 4,901,166
DATED : February 13, 1990
INVENTOR(S) : Toshiaki Kojima

It is certified that error appears in the above-identified patent and that said Letters Patent is hereby corrected as shown below:

Col. 4, line 27, change "dive" to --drive--

Col. 6, line 39, change "HHD1" to --$HHD_1$-- line 52, change "HHD1" to --$HHD_1$--

IN THE CLAIMS:

Col. 10, line 41, change "signal" to --signals--

Signed and Sealed this

Sixth Day of August, 1991

*Attest:*

HARRY F. MANBECK, JR.

*Attesting Officer*    *Commissioner of Patents and Trademarks*